(12) United States Patent
Ruth et al.

(10) Patent No.: US 7,285,355 B2
(45) Date of Patent: Oct. 23, 2007

(54) BATTERY

(75) Inventors: Alan Ruth, Orem, UT (US); Andy Szyszkowski, Canyon Country, CA (US); Clay Kishiyama, Valencia, CA (US); Hiroyuki Yumoto, Stevenson Ranch, CA (US); Hisashi Tsukamoto, Saugus, CA (US)

(73) Assignee: Quallion LLC, Sylmar, CA (US)

( * ) Notice: Subject to any disclaimer, the term of this patent is extended or adjusted under 35 U.S.C. 154(b) by 876 days.

(21) Appl. No.: 10/426,108

(22) Filed: Apr. 29, 2003

(65) Prior Publication Data

US 2003/0211388 A1 Nov. 13, 2003

Related U.S. Application Data

(63) Continuation of application No. 09/842,790, filed on Apr. 25, 2001, now Pat. No. 6,605,382.

(60) Provisional application No. 60/199,893, filed on Apr. 26, 2000.

(51) Int. Cl.
*H01M 2/02* (2006.01)
*H01M 2/26* (2006.01)

(52) U.S. Cl. .................. 429/211; 429/94; 429/175; 429/161

(58) Field of Classification Search ............. None
See application file for complete search history.

(56) References Cited

U.S. PATENT DOCUMENTS

| | | | |
|---|---|---|---|
| 2,572,071 A | 10/1951 | Ellis | |
| 2,582,973 A | 1/1952 | Ellis | |
| 2,585,922 A | 2/1952 | Ellis | |
| 2,768,229 A | 10/1956 | Herbert | |
| 3,791,868 A | 2/1974 | Compton et al. | |
| 3,826,685 A | 7/1974 | Dublin et al. | |
| 3,985,576 A | 10/1976 | Lingscheit et al. | |
| 4,053,687 A | 10/1977 | Coibion et al. | |
| 4,158,721 A | 6/1979 | Decker et al. | |
| 4,167,413 A | 9/1979 | Christ et al. | |
| 4,170,694 A | 10/1979 | Chase et al. | |
| 4,180,700 A | 12/1979 | Kraska et al. | |
| 4,215,466 A | 8/1980 | Bindin | |
| 4,217,137 A | 8/1980 | Kraska et al. | |
| 4,288,843 A | 9/1981 | Schroeder | |
| 4,294,897 A | 10/1981 | Bindin | |

(Continued)

FOREIGN PATENT DOCUMENTS

EP 0 235 504 A1 9/1987

(Continued)

OTHER PUBLICATIONS

Article 34 Amendment as filed on Nov. 9, 2001 in relation to Application No. PCT/US01/13398.
Written Opinion, dated May 20, 2002, as received in relation to Application No. PCT/US01/13398.
Reply to Written Opinion as filed on Jun. 18, 2002 in relation to Application No. PCT/US01/13398.
International Preliminary Examination Report, dated Aug. 5, 2002, as received in relation to Application No. PCT/US01/13398.

*Primary Examiner*—John S. Maples
(74) *Attorney, Agent, or Firm*—Gavrilovich Dodd & Lindsey, LLP

(57) ABSTRACT

A lithium ion battery configured to yield a high energy density output by minimizing head space, i.e., wasted interior volume, within the battery case and/or by reducing electrical energy losses internal to the battery.

26 Claims, 5 Drawing Sheets

U.S. PATENT DOCUMENTS

| | | | |
|---|---|---|---|
| 4,375,127 A | 3/1983 | Elkins et al. | |
| 4,722,137 A | 2/1988 | Ellenberger | |
| 4,940,858 A | 7/1990 | Taylor et al. | |
| 5,053,294 A | 10/1991 | Sernka et al. | |
| 5,134,044 A | 7/1992 | Megerle | |
| 5,194,337 A | 3/1993 | Yoshida et al. | |
| 5,279,909 A | 1/1994 | Horner et al. | |
| 5,320,915 A | 6/1994 | Ali et al. | |
| RE34,819 E | 1/1995 | Mizuhara | |
| 5,411,818 A | 5/1995 | Barlow et al. | |
| 5,578,394 A | 11/1996 | Oweis et al. | |
| 5,789,068 A | 8/1998 | King et al. | |
| 6,040,086 A | 3/2000 | Yoshida et al. | |
| 6,042,625 A | 3/2000 | Daio et al. | |
| 6,071,638 A * | 6/2000 | Fradin | 429/94 |
| 6,087,041 A * | 7/2000 | Tucholski et al. | 429/186 |
| 6,114,059 A | 9/2000 | Watanabe et al. | |
| 6,139,986 A | 10/2000 | Kurokawa et al. | |
| 6,197,074 B1 | 3/2001 | Satou et al. | |
| 6,219,224 B1 | 4/2001 | Honda | |
| 6,235,424 B1 * | 5/2001 | Cho | 429/175 |
| 6,245,457 B1 | 6/2001 | Romero | |
| 6,245,464 B1 | 6/2001 | Spillman et al. | |
| 6,258,485 B1 | 7/2001 | Kitoh | |
| 6,280,873 B1 | 8/2001 | Tsukamoto | |
| 6,319,628 B1 | 11/2001 | Zama | |
| 6,335,117 B1 | 1/2002 | Yoshida et al. | |
| 6,379,840 B2 | 4/2002 | Kitoh et al. | |
| 6,440,604 B1 * | 8/2002 | Inoue et al. | 429/211 |
| 6,521,350 B2 | 2/2003 | Fey et al. | |
| 2001/0046625 A1 | 11/2001 | Ruth, II et al. | |
| 2001/0053476 A1 | 12/2001 | Ruth et al. | |
| 2002/0142216 A1 | 10/2002 | Skoumpris | |

FOREIGN PATENT DOCUMENTS

| | | |
|---|---|---|
| EP | 0 989 623 A1 | 3/2000 |
| EP | 1 246 275 A2 | 10/2002 |
| JP | 59-012557 | 1/1984 |
| JP | 01073750 A2 | 3/1989 |
| JP | 1239958 A2 | 9/1989 |
| JP | 01253941 A2 | 10/1989 |
| JP | 05-060241 | 3/1993 |
| JP | 6036795 A2 | 2/1994 |
| JP | 10-012270 | 1/1998 |
| JP | 11186423 A2 | 7/1999 |
| JP | 11-224660 A | 8/1999 |
| JP | 11-250934 A2 | 9/1999 |
| JP | 2000-058033 A2 | 2/2000 |
| JP | 2000068396 A2 | 3/2000 |
| JP | 2000100474 A2 | 4/2000 |
| JP | 2000311666 A2 | 11/2000 |
| JP | 2000323105 A2 | 11/2000 |
| JP | 2001052759 A2 | 2/2001 |
| WO | WO 01/82397 A1 | 11/2001 |
| WO | WO 02/102589 A1 | 12/2002 |
| WO | WO 02/102590 A1 | 12/2002 |

* cited by examiner

BATTERY

CROSS-REFERENCE TO RELATED APPLICATIONS

This is a Continuation of application Ser. No. 09/842,790, filed Apr. 25, 2001, now U.S. Pat. No. 6,605,382, which claims priority to Provisional Application Ser. No. 60/199,893, filed Apr. 26, 2000.

FIELD OF THE INVENTION

This invention relates to a lithium ion battery construction for producing a high energy density output.

BACKGROUND OF THE INVENTION

Various applications, such as in hybrid electric vehicles (HEV), require batteries exhibiting a high energy density output. "Energy density" refers to the ratio of the energy available from a battery to the weight or volume of the battery.

SUMMARY OF THE INVENTION

The present invention is directed to a lithium ion battery, and fabrication method therefor, configured to yield a high energy density output by minimizing head space, i.e., wasted interior volume, within the battery case and/or by reducing electrical energy losses internal to the battery.

A battery in accordance with the present invention includes a metal case comprised of a thin peripheral wall, e.g., cylindrical, surrounding an interior volume. In accordance with a preferred embodiment, the interior volume is substantially fully occupied by an electrode assembly comprised of a positive electrode strip, a negative electrode strip, and separator strips, superimposed on one another and helically wound to form a so called "jelly roll". The positive electrode strip is formed of a metal substrate or foil, e.g., aluminum, having positive active material formed on both faces thereof. The negative electrode strip is formed of a metal substrate or foil, e.g., copper, having negative active material formed on both faces thereof.

In accordance with the invention, a set of multiple negative tabs extend from spaced locations along the negative electrode substrate toward the upper end of the case peripheral wall. A set of multiple positive spaced tabs extend from the positive electrode substrate toward the lower end of the case peripheral wall.

In accordance with a preferred embodiment of the invention, the negative tabs are electrically connected to a current collector, i.e., a metal ring, mounted within the interior volume adjacent to the upper end of the case peripheral wall. The metal ring is insulated from the peripheral wall, preferably by a concentric dielectric ring.

In further accordance with the preferred embodiment, the positive tabs are electrically connected to the peripheral wall by first folding them over the lower wall edge. A conductive end cap is mounted against the peripheral wall lower edge to pinch and electrically connect the positive tabs therebetween. The end cap is then sealed to the case peripheral wall, e.g., by laser welding, to completely seal the battery lower end and electrically connect the positive tabs to the case peripheral wall.

DETAILED DESCRIPTION

The following text describes a presently contemplated preferred embodiment for practicing the invention. The description of the preferred embodiment should not be interpreted as a limitation on the scope of the invention which is defined by the accompanying claims.

Figure 1:
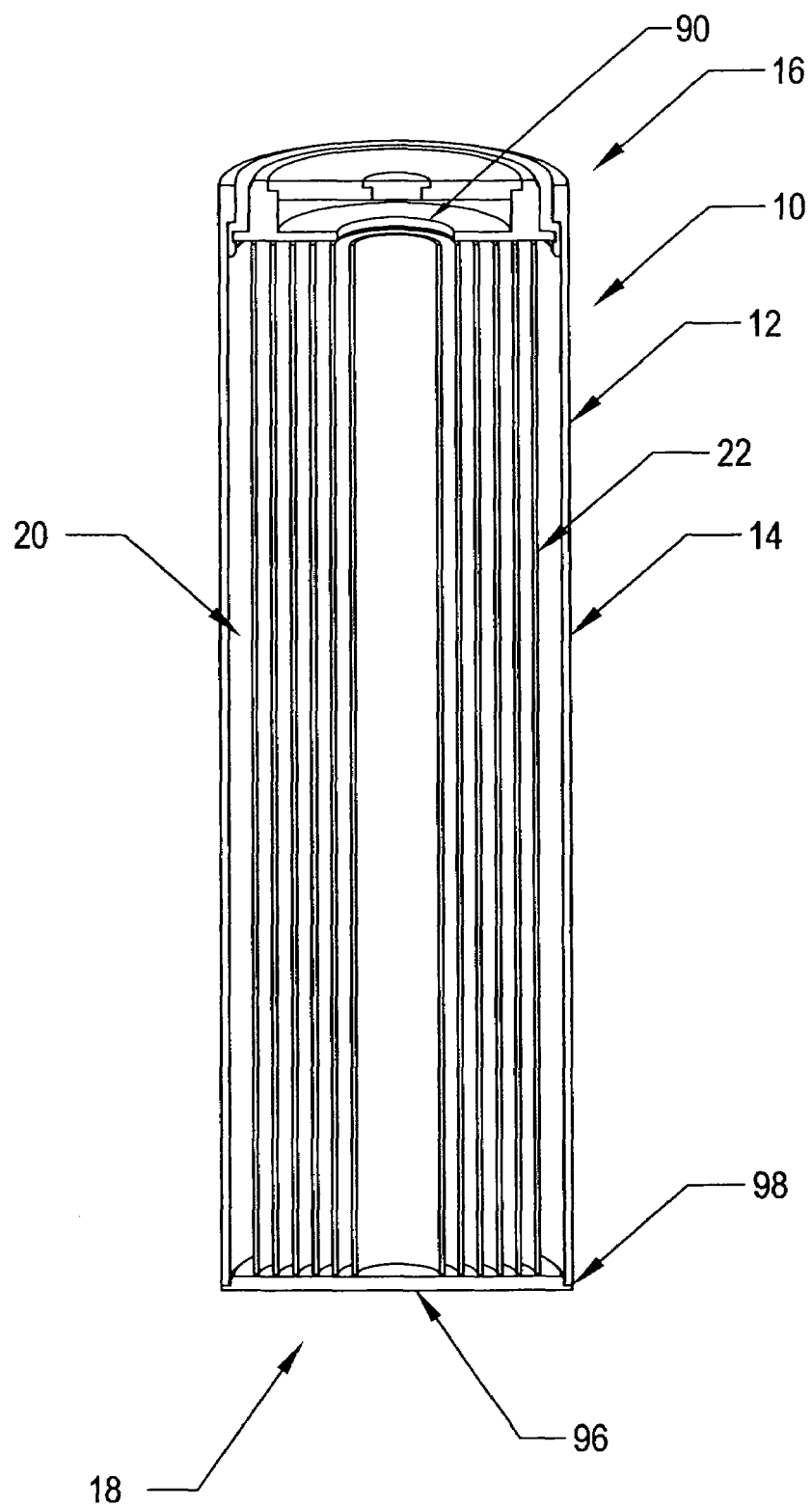
FIG. 1 comprises a cutaway side view of a battery in accordance with the present invention.

FIG. 1 illustrates the preferred construction of a battery in accordance with the present invention for producing a high energy density output. The battery is comprised of a case 12 including a peripheral wall 14 formed of a thin sheet of metal, e.g., aluminum. The peripheral metal wall 14 preferably, but not necessarily, forms a cylindrical tube, having an open upper end 16 and open lower end 18. The peripheral wall 14 defines an interior volume 20 which is to be essentially fully occupied by an electrode assembly 22, preferably configured as a so called "jelly roll", in accordance with the assembly procedure to be described hereinafter.

The jelly roll assembly 22 is comprised of a negative electrode strip, a positive electrode strip, and separator strips, superimposed and helically wound together. More particularly, attention is directed to FIG. 2 which illustrates a cross sectional portion of the jelly roll assembly 22. It can be seen that the assembly is comprised of a first polarity (e.g., negative) electrode strip 30, a second polarity (e.g., positive) electrode strip 32 and separator strips 34. The negative electrode strip 30 is comprised of an elongate metal substrate 40, e.g., copper foil, having negative active material 42 deposited on both faces of the foil substrate 40. Similarly, the positive electrode strip 32 is comprised of an elongate metal substrate 44, e.g., aluminum foil, having positive active material 46 deposited on both faces thereof. Dielectric separator strips, e.g., polyethylene, separate adjacent electrode strip layers.

Figure 2:
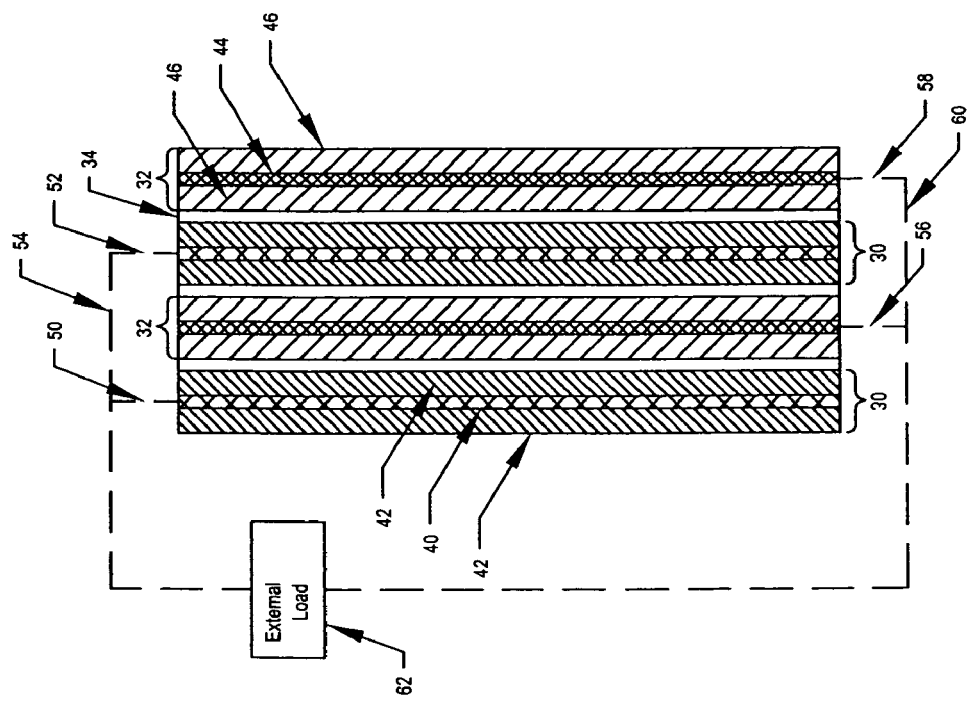
FIG. 2 comprises an enlarged sectional view depicting multiple layers of an electrode assembly or "jelly roll" contained within the battery case of FIG. 1.

Jelly roll assemblies as thus far described are well known in the art, as are suitable positive and negative active materials and substrates. The present invention is directed to a preferred construction for maximizing the energy density output from a battery utilizing a jelly roll assembly of known materials. In accordance with a first aspect of the invention, as schematically represented in FIG. 2, multiple positive and negative tabs extend in opposite directions from the electrode strip substrates and are respectively electrically connected to the case and a negative end cap. For example, note that FIG. 2 depicts tabs 50 and 52 extending upwardly from the negative substrate 40 and connected together by a current collector 54. Similarly, FIG. 2 schematically depicts multiple tabs 56 and 58 extending downwardly from positive electrode substrate 44 for connection to a current collector 60. The respective current collectors 54 and 60 can be externally connected to provide power to a load represented at 62.

Figure 3:
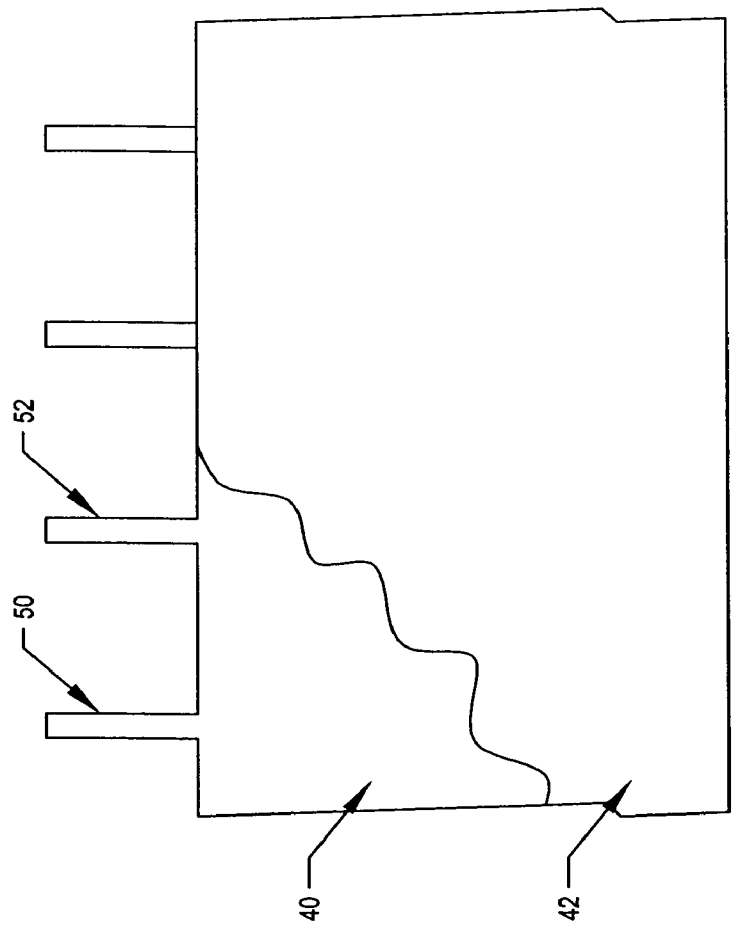
FIG. 3 depicts a portion of an electrode strip employed in the jelly roll of FIG. 2 showing the electrode substrate, the active material thereon, and multiple tabs extending outward from the substrate.

Attention is now directed to FIG. 3 which illustrates a portion of an electrode strip in accordance with the invention for use in the jelly roll assembly 22. The electrode strip of FIG. 3 is depicted as comprising a negative metal substrate 40 having spaced multiple tabs 50, 52 etc electrically connected thereto and extending outwardly therefrom. The tabs can be formed integral with the elongate metal foil forming the substrate 40 or can be separate metal members connected to the foil 40 as by welding. FIG. 3 also depicts the negative active material 42 affixed to the face of the substrate 40. The positive electrode strip is constructed similarly to the negative electrode strip illustrated in FIG. 3 except that its tabs 56, 58 extend in a direction opposite to the direction of tabs 50 and 52.

Figure 4:
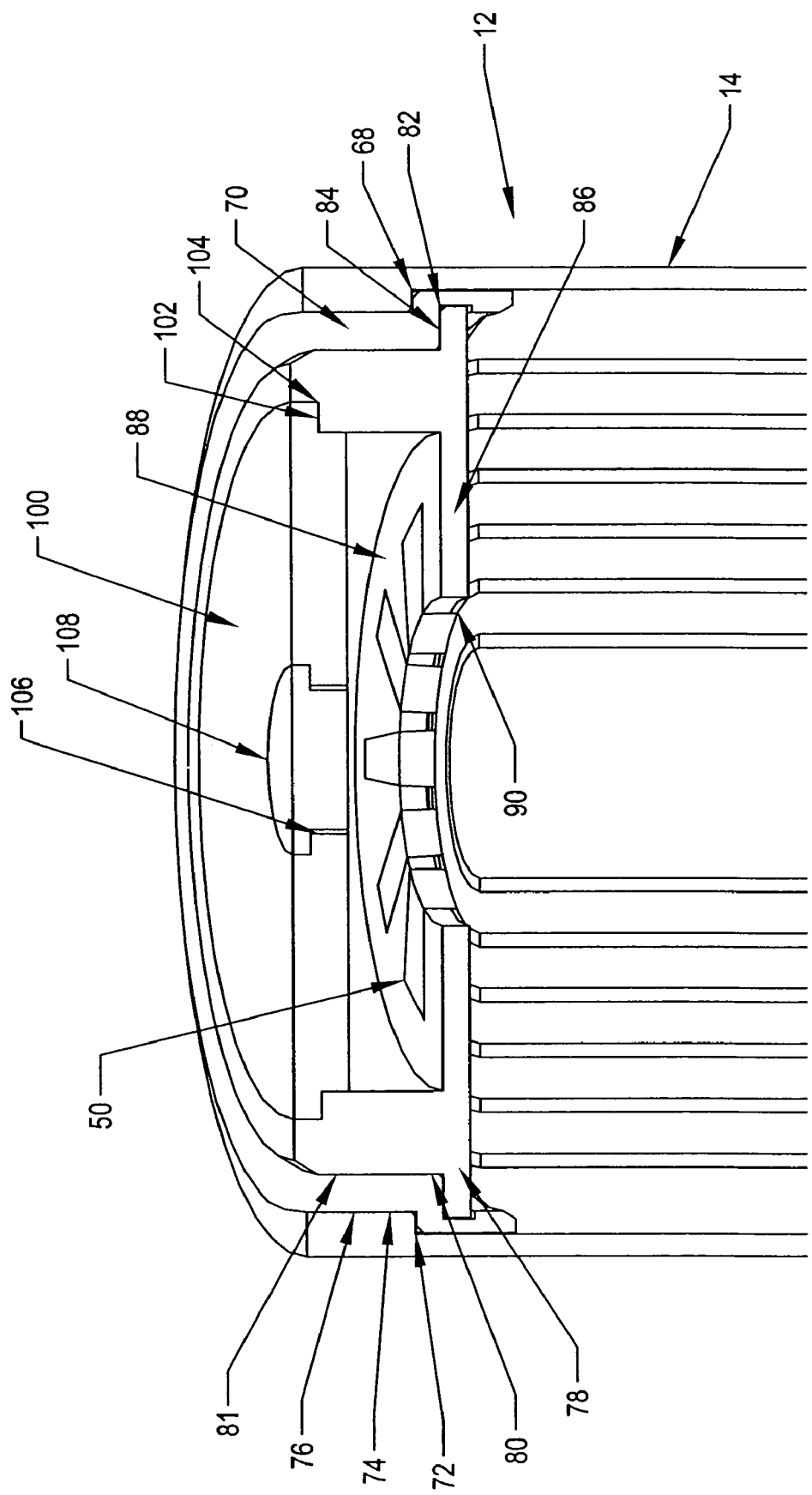
FIG. 4 is an enlarged cutaway side view of the upper end of the battery of FIG. 1 showing multiple tabs extending from the jelly roll assembly and electrically connected to a metal ring insulated from the battery case peripheral wall by a dielectric ring.
Figure 5:
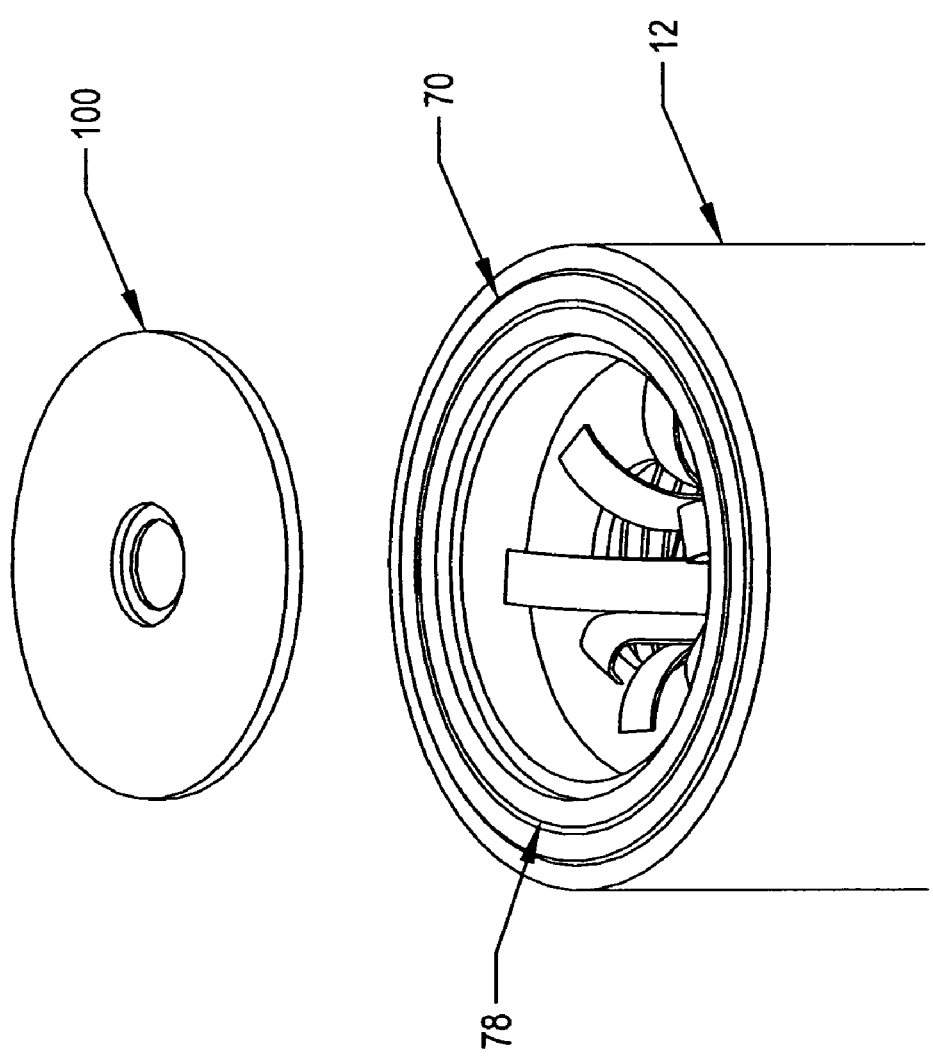
FIG. 5 is an isometric view showing the upper end of the battery similar to FIG. 4 but with the end cap displaced.

Attention is now directed to FIG. 4 which illustrates the upper end of the battery case 12 in greater detail. Note that the peripheral wall 14 defines an inwardly extending annular shoulder 68 proximate to its upper end. Prior to inserting the electrode assembly 22 into the case 12, a dielectric ring, e.g., PFA, 70 is inserted into the interior case volume from the peripheral wall open lower end 18. The dielectric ring 70 defines a shoulder 72 which is seated flush against the annular shoulder 68. More specifically, the dielectric ring 70 is dimensioned so that its outer diameter 74 is press-fit against the inner diameter 76 at the upper end of the peripheral wall 14. The press-fit between the dielectric ring 70 and the inner surface of the peripheral wall 14 forms a seal preventing any leakage therepast.

After the dielectric ring 70 is installed at the upper end of the peripheral wall 14, a metal ring 78, e.g., nickel, is inserted from the open lower end 18 of the peripheral wall and concentrically seated against the dielectric ring 70. More particularly, the outer surface 80 of ring 78 is press fit and seals against the inner surface 81 of dielectric ring 70. More over, shoulder 82 of metal ring 78 seats against shoulder 84 of dielectric ring 70. Note that the metal ring 78 defines an inwardly extending flange 86 having an upper surface 88.

After the metal ring 78 and dielectric ring 70 have been installed at the upper end of the peripheral wall 14, the aforedescribed jelly roll assembly 22 is inserted into the case 12 from the open lower end 18. The upwardly extending negative tabs 50, 52 are formed to extend through a central opening 90 in annular flange 86. The negative tabs 50, 52 are then electrically secured, as by welding, to the ring surface 88.

Figure 6:
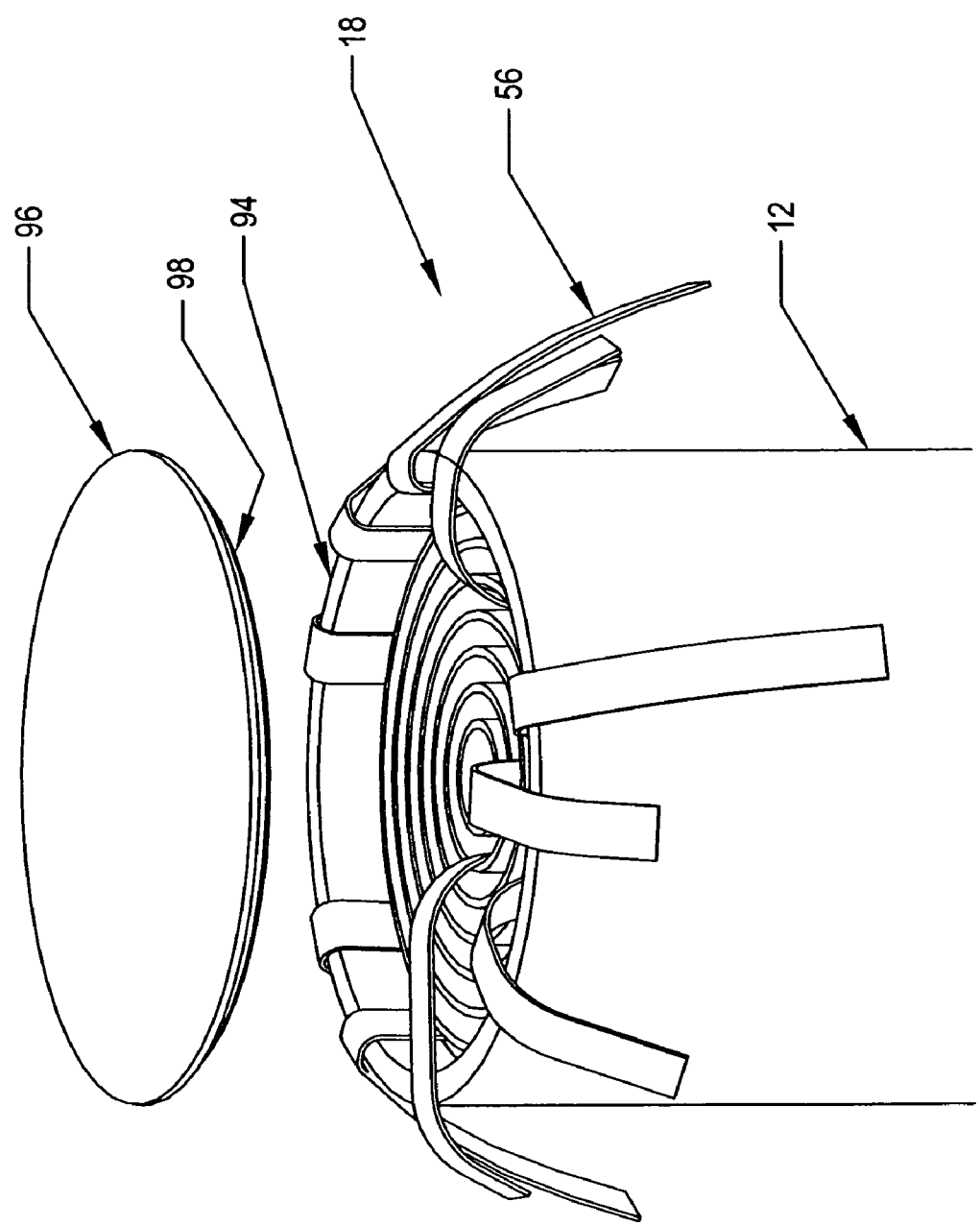
FIG. 6 is an isometric view showing the lower end of the battery having multiple tabs extending from the jelly roll and folding over the peripheral wall bottom edge for capture by an end cap which is then sealed to the peripheral wall bottom edge.

The positive tabs 56, 58, etc. extend outwardly form the lower end 18 of case 12. The lower end 18 terminates at a bottom wall edge 94. The positive tabs 56, 58 etc. are folded over the edge 94 as depicted in FIG. 6. Thereafter, an end cap 96 is mounted on the edge 94, pinching the positive tabs therebetween. The end cap 96 is preferably aluminum and is welded to the bottom edge 94 thereby electrically connecting the positive tabs to the case peripheral wall 14. Protruding tab material is then trimmed to the end cap circumference. The end cap 96 is preferably formed with an annular shoulder 98 which bears against the bottom edge 94 of the wall 14 enabling the ready formation of a leak free seal by various techniques, such as laser welding.

After the lower open end of the casing 12 is sealed by the end cap 96, electrolyte can be inserted into the battery via the aforementioned central opening 90 in metal ring flange 86. A large end cap 100 defining an annular shoulder 102 is sealed against annular shoulder 104 on metal ring 78. The end cap 100 defines a central opening 106, which is then sealed by minor end cap 108.

From the foregoing, it should now be recognized that a battery construction has been described herein which minimizes the amount of wasted space within the battery case and insures that substantially the entire interior volume sealed within the case is available and can be used for accommodating an electrode assembly. Wasted interior space is minimized by directly connecting a plurality of first polarity tabs extending from the electrode assembly to a current collection ring adjacent the upper end of the case. A plurality of second polarity tabs is directly connected to a lower edge of the case thereby assuring that substantially the entire volume is available for accommodating the electrode assembly. This construction yields a high energy density output which is further enhanced by the utilization of multiple tabs which reduces the internal resistance of the battery.

While the invention has been described with reference to a specific preferred embodiment, it should be recognized that numerous modifications and variations will occur to those skilled in the art without departing from the spirit and scope of the invention defined by the appended claims.

The invention claimed is:

1. A battery comprising:
   a case;
   a dielectric electrically insulating an electrically conducting ring from the case; and
   an electrically conducting first end cap sealed to the ring
   an electrode assembly in an interior of the case, the electrode assembly including a first set of tabs extending through an opening in the ring and connected to the ring such that the first set of tabs are in electrical communication with the ring.

2. The battery of claim 1, wherein the case includes an interior shoulder in the interior of the case and the dielectric member includes an outer shoulder seated against the interior shoulder of the case.

3. The battery of claim 1, wherein the dielectric member is press-fit against a wall of said case to form a seal.

4. The battery of claim 1, wherein the ring is press fit against an inner surface of dielectric member so as to form a seal.

5. The battery of claim 1, wherein the dielectric member includes an interior shoulder and the ring defines an outer shoulder seated against interior shoulder of the dielectric member.

6. The battery of claim 1, wherein the ring is in the interior of the case.

7. The battery of claim 1, further comprising:
   a second end cap sealed to the case.

8. The battery of claim 1, wherein the electrode assembly including a second set of tabs and the case includes a first end and a second end and a second end cap is secured to the case such that the second set of tabs extend between the case and the second end cap.

9. The battery of claim 8, wherein the second set of tabs extend from electrodes in the electrode assembly in an opposite direction from the first set of tabs.

10. A battery comprising:

a battery case having first and second ends;
an electrode assembly in the case, the electrode assembly including a first plurality of tabs and a second plurality of tabs,
the first plurality of tabs being electrically connected to a metal member that is proximate the first end of the case, and
the second plurality of tabs pinched between the second end of the case and a metal second end cap.

11. The battery of claim 10, wherein the case is metal.

12. The battery of claim 10, wherein a dielectric member electrically insulates the metal member from the case.

13. The battery of claim 10, further comprising:
an electrically conducting first end cap capping the first end of the case.

14. The battery of claim 10, wherein the second end cap caps the second end of the case.

15. The battery of claim 10, wherein a laser weld seals the metal second end cap to the case.

16. The battery of claim 10, wherein the metal member includes an electrically conducting ring and a dielectric member electrically insulates the ring from the case.

17. The battery of claim 16, wherein an interior of the case includes an interior shoulder, and the dielectric member includes an outer shoulder seated against the interior shoulder.

18. The battery of claim 16, wherein the dielectric member is press-fit against a wall of the case so as to form a seal.

19. The battery of claim 16, wherein the ring is press-fit against an inner surface of the dielectric member so as to form a seal.

20. The battery of claim 16, wherein the dielectric member defines an interior shoulder and the ring defines an outer shoulder that is seated against the interior shoulder of the dielectric member.

21. The battery of claim 16, wherein the ring is into interior of the case.

22. The battery of claim 16, wherein the first plurality of tabs extend from said electrode assembly through an opening in the ring and are attached to the ring such that the first plurality of tabs is in electrical communication with the ring.

23. The battery of claim 10, wherein the electrode assembly includes a plurality of electrodes and the second plurality of tabs and the first plurality of tabs extend from the electrodes in opposite directions.

24. A battery, comprising:
a battery case having first and second ends;
an electrically conducting member mounted to a dielectric member;
a first plurality of tabs electrically connected to the conducting member;
an electrically conducting first end cap sealed to the conducting member; and
a second plurality of tabs pinched between the second end of the battery case and a second end cap.

25. The battery of claim 24, wherein the conducting member includes a metal ring.

26. The battery of claim 24, wherein the second end cap is metal.

* * * * *